United States Patent [19]
Beierl

[11] Patent Number: 6,019,416
[45] Date of Patent: Feb. 1, 2000

[54] MOTOR VEHICLE HAVING A RETRACTABLE ROOF CONSTRUCTION AND A METHOD FOR OPERATING SAME

[75] Inventor: Dominik Beierl, Korntal-Muenchingen, Germany

[73] Assignee: Ing. h.c.F. Porsche AG, Weissach, Germany

[21] Appl. No.: 09/210,395

[22] Filed: Dec. 14, 1998

[30]     Foreign Application Priority Data

Dec. 12, 1997 [DE]  Germany ............................ 197 55 254

[51] Int. Cl.[7] ...................................................... B60J 7/14
[52] U.S. Cl. ................................ 296/107.17; 296/107.08; 296/107.07; 296/107.18
[58] Field of Search ......................... 296/107.17, 107.08, 296/107.07, 107.18

[56]                 References Cited

U.S. PATENT DOCUMENTS

| 5,209,544 | 5/1993 | Benedetto et al. | 296/107.08 |
|---|---|---|---|
| 5,542,735 | 8/1996 | Furst et al. | 296/107.17 |
| 5,654,615 | 8/1997 | Brodsky | 296/107.08 |
| 5,769,483 | 6/1998 | Danzl et al. | 296/107.08 |
| 5,823,606 | 10/1995 | Schenk et al. | 296/107.08 |

FOREIGN PATENT DOCUMENTS

| 0 764 553 A1 | 3/1997 | European Pat. Off. . |
|---|---|---|
| 43 20 468 C1 | of 0000 | Germany . |
| 44 35 222 C1 | of 0000 | Germany . |
| 39 03 358 A1 | 8/1990 | Germany . |

OTHER PUBLICATIONS

European Search Report.

*Primary Examiner*—Gary C. Hoge
*Attorney, Agent, or Firm*—Evenson, McKeown, Edwards & Lenahan, P.L.L.C.

[57]                 ABSTRACT

A motor vehicle having a retractable roof having at least one roof part arranged over the occupants and a rear part having a rear window. The roof is movable from a closed position covering the occupant compartment into a rear-side deposited position in which the rear part and the roof part are received in a rear-side receiving space closed by a swivellable lid. The retractable roof construction, in the rear-side deposited position, requires less space and, can be used in additional intermediate positions. The rear part is composed of a center part having the rear window and of two side parts, the center part being slidable into the roof part situated in front of it and, together with it, being displaceable in the rear-side receiving space when the lid is open.

20 Claims, 18 Drawing Sheets

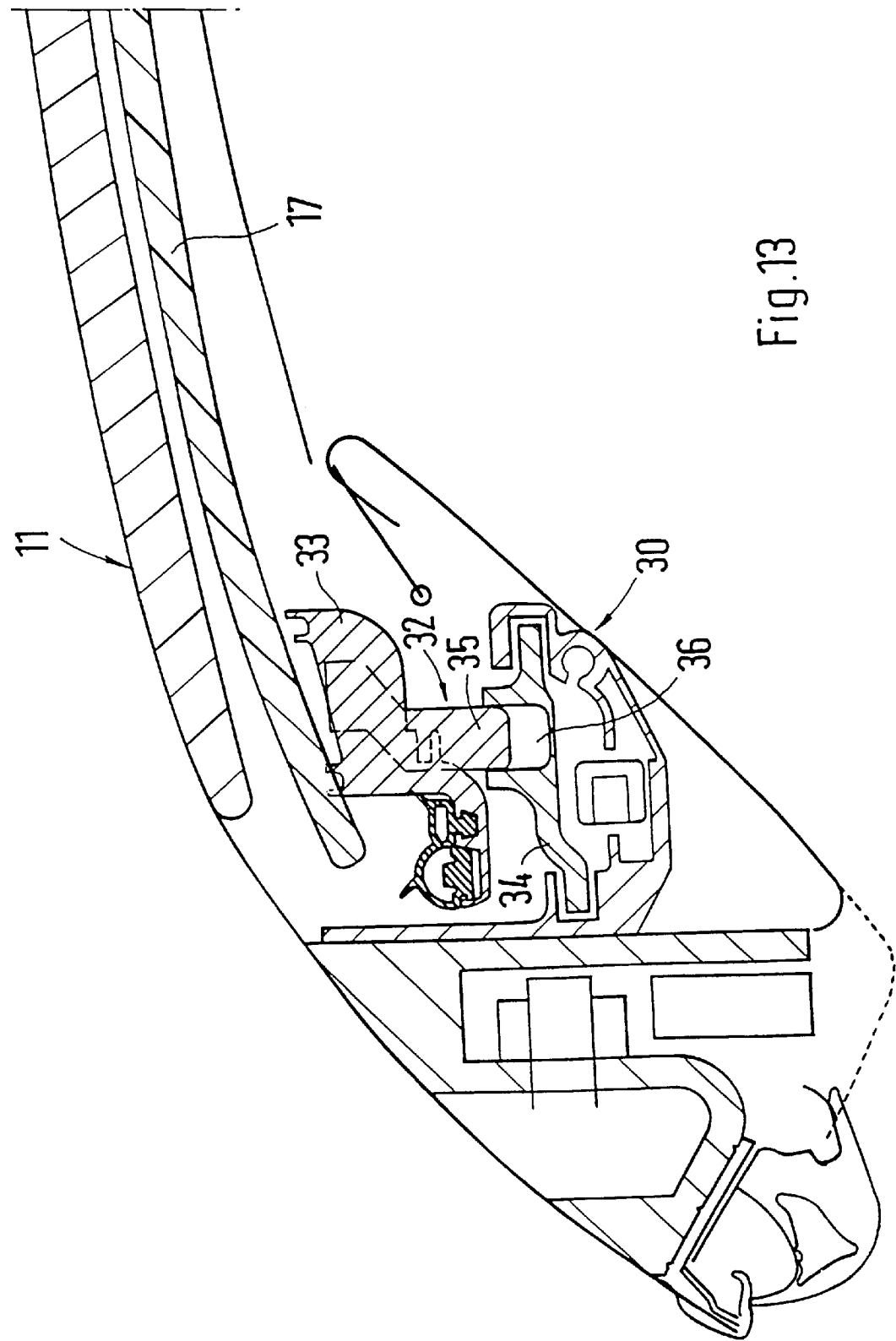

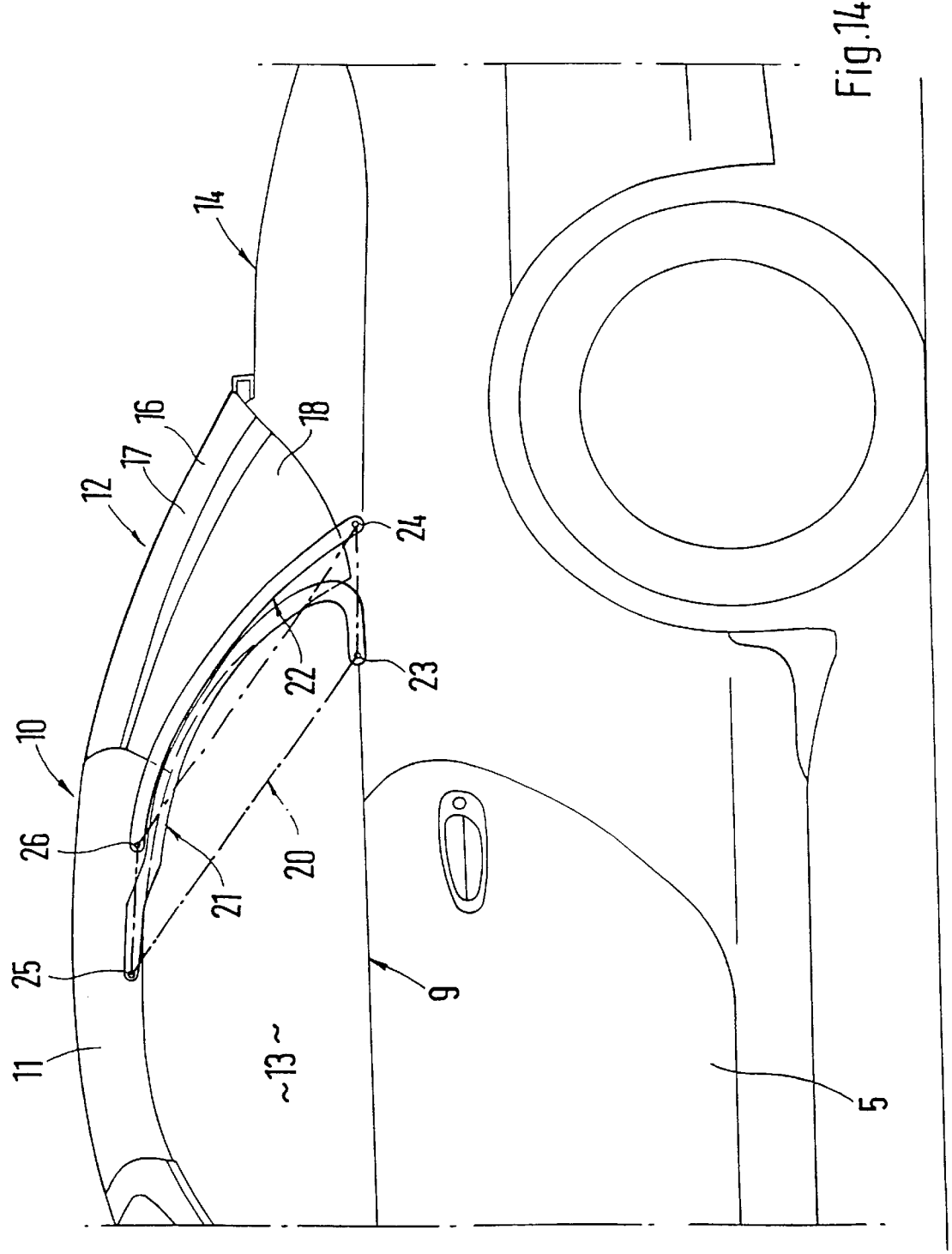

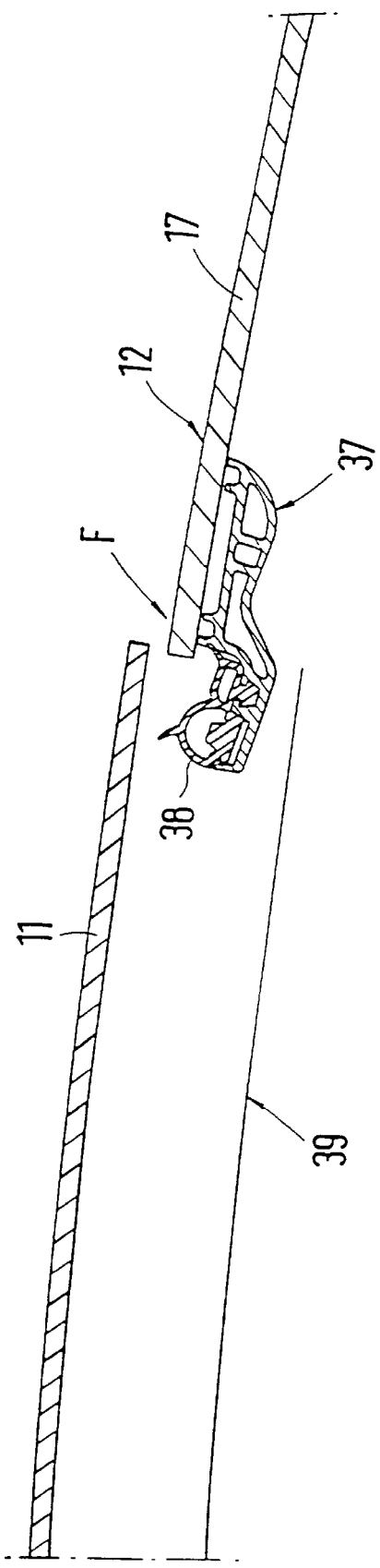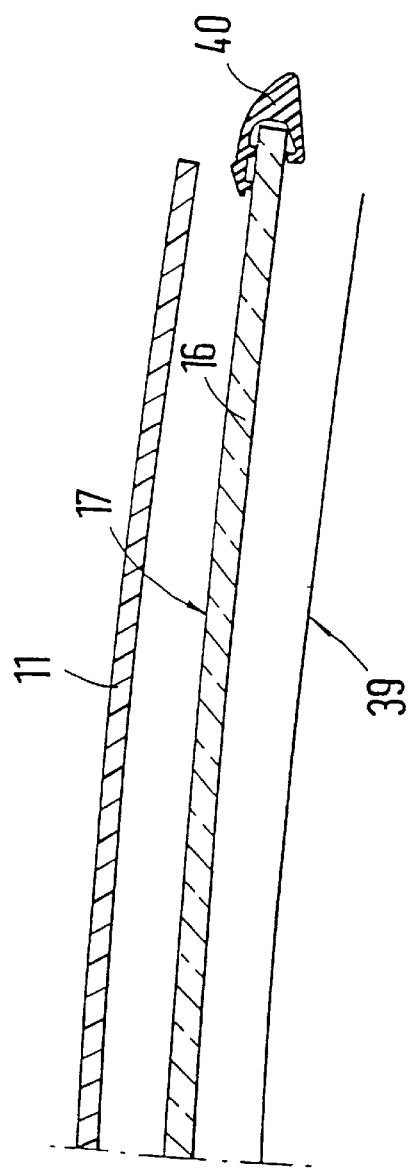

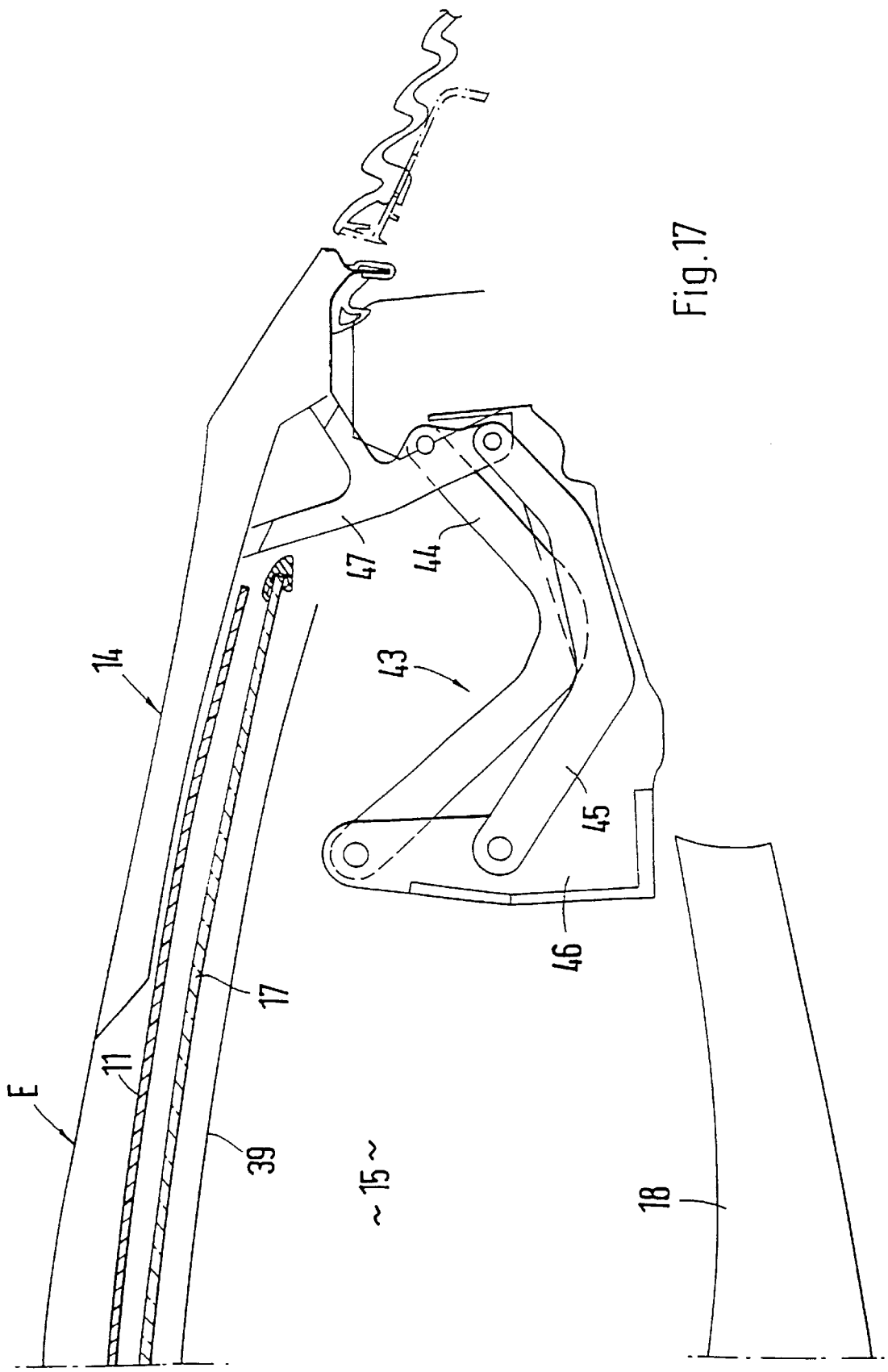

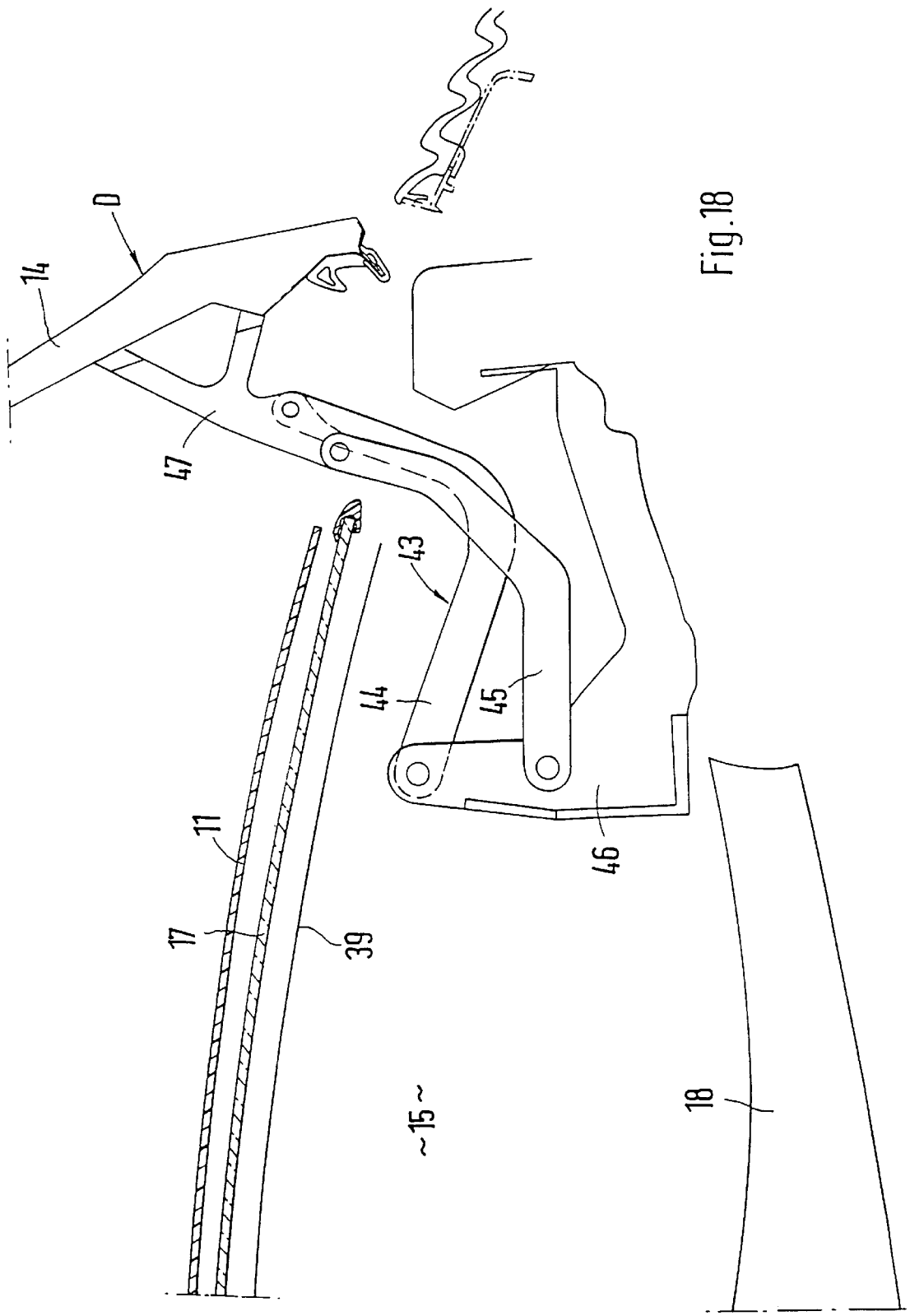

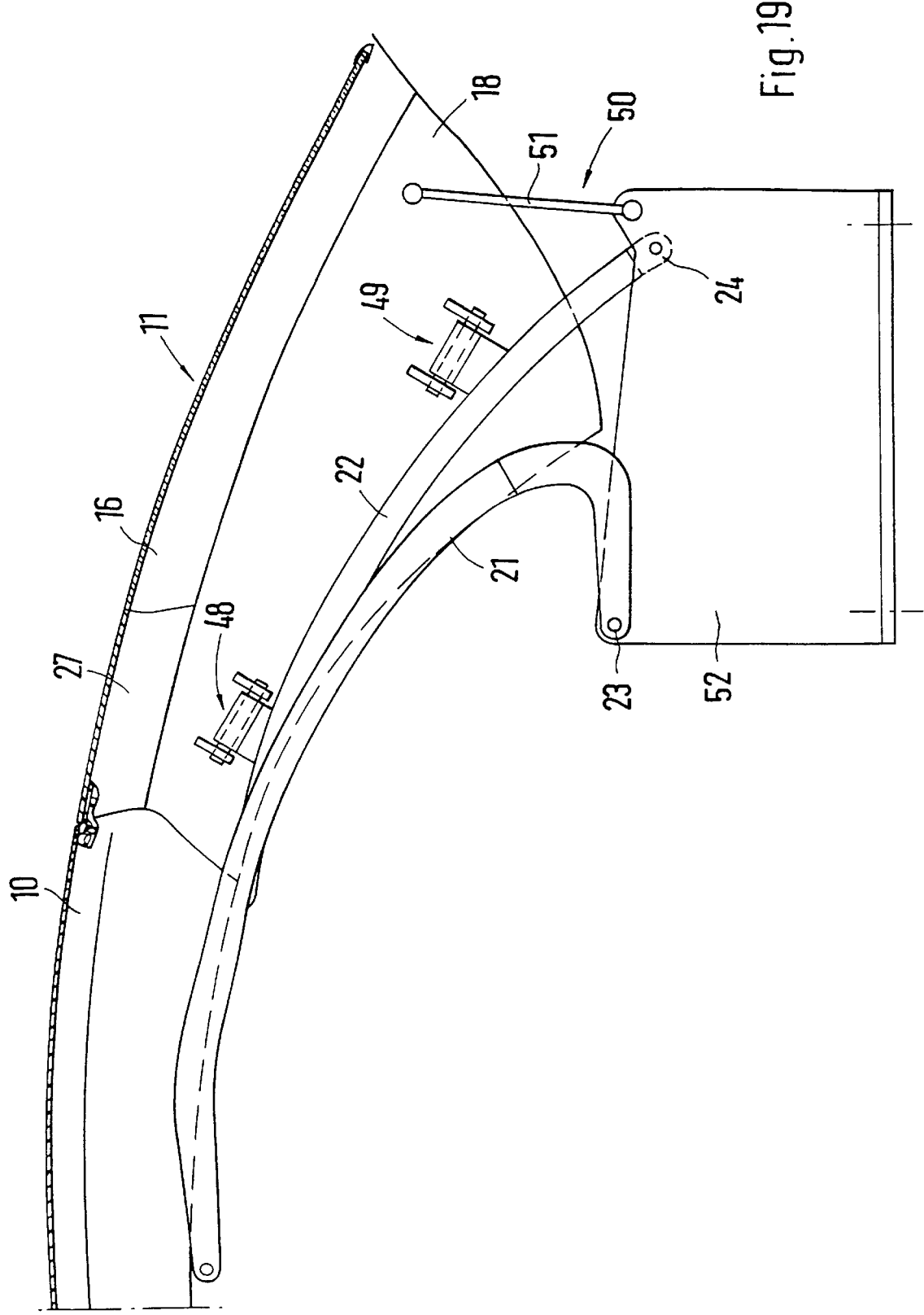

MOTOR VEHICLE HAVING A RETRACTABLE ROOF CONSTRUCTION AND A METHOD FOR OPERATING SAME

BACKGROUND AND SUMMARY OF THE INVENTION

This application claims the priority of German Patent Application No. 197 55 254.4, filed Dec. 12, 1997, the disclosure of which is expressly incorporated by reference herein.

The invention relates to a motor vehicle having a retractable roof construction. The roof has a rear part comprising a center part made up of a rear window and two side walls, the center part being slideable into the rear roof part when the roof is opened.

From German Patent Document DE 43 20 468 C1, a motor vehicle is known which has a retractable roof construction which comprises a roof part above the occupants. The roof part has a rear part having a rear window. The roof is constructed to be movable from a closed position, which completely covers an occupant compartment, to a retracted rear-side deposited position. In the retracted position, in which the roof part and rear part are folded together, the roof part and rear part are accommodated in a rear-side receiving space which is closed by an upwardly swivelling lid. In this arrangement, the roof part and the rear part are swivellably connected with one another by way of a transversely extending axis of rotation. In addition, the rear part can be swivelled about a rear swivelling axis fixed to the vehicle. In the rear-side deposited position, the roof part is folded onto the rear part which is situated underneath the roof part. In the rear-side deposited position, this roof construction requires a relatively large amount of space in the rear area of the motor vehicle. Furthermore, by means of this roof construction, the vehicle can be used only in two different positions, specifically in a closed position and in a deposited position.

It is an object of the invention to further develop a roof construction of the aforementioned type such that, in the rearside deposited position, the roof construction requires less space and in addition to being usable in the closed and the deposited position, can also be used in additional positions.

The principal advantages achieved by means of the invention are that the deposited roof construction—particularly viewed in the vertical direction—requires less space within the accommodating compartment. This is because, in the deposited position, the center part of the rear part is pushed toward the front and is accommodated virtually inside the roof part. In addition, the cambers of the roof part and the center part extend in the same direction with respect to one another. Also, in addition to being usable in both the closed and deposited positions, this roof construction can be used in two additional positions, specifically a venting position with an inwardly folded center part and a position with a large-surface rear opening in which the center part is pushed under the roof part situated in front of it.

The latter position is particularly advantageous For southern countries, because direct sun radiation onto the occupant's head is avoided but because of the large-surface rear opening, a sufficient amount of air can nevertheless flow into the motor vehicle.

The kinematics for the displacement of the roof construction comprise a four bar linkage arrangement that is particularly desirable. As the result of this arrangement, the forward roof element can be displaced in parallel to itself toward the rear into the receiving compartment.

The roof construction according to the invention has a simple construction and can be manufactured in a simple manner and at reasonable cost. In contrast to a folding top construction, this type of a roof construction does not require an additional hardtop.

Other objects, advantages and novel features of the present invention will become apparent from the following detailed description of the invention when considered in conjunction with the accompanying drawings.

BRIEF DESCRIPTION OF THE DRAWINGS

FIG. 13 is an enlarged sectional view according to Line XIII—XIII of FIG. 1;

FIG. 14 is a partial lateral view of the roof construction in the closed position;

FIG. 15 is a sectional view corresponding to FIG. 9, but in a folded-in venting position F of the center part;

FIG. 16 is an enlarged sectional view according to Line XVI—XVI of FIG. 2;

FIG. 17 is an lateral enlarged view of a four bar hinge for the rear-side lid in the closed position and of the deposited roof construction;

FIG. 18 is an enlarged lateral view similar to FIG. 17 but with an open lid;

FIG. 19 is a lateral view of the kinematics of the lateral parts in the closed position of the roof construction.

DETAILED DESCRIPTION OF THE DRAWINGS

Figure 1:
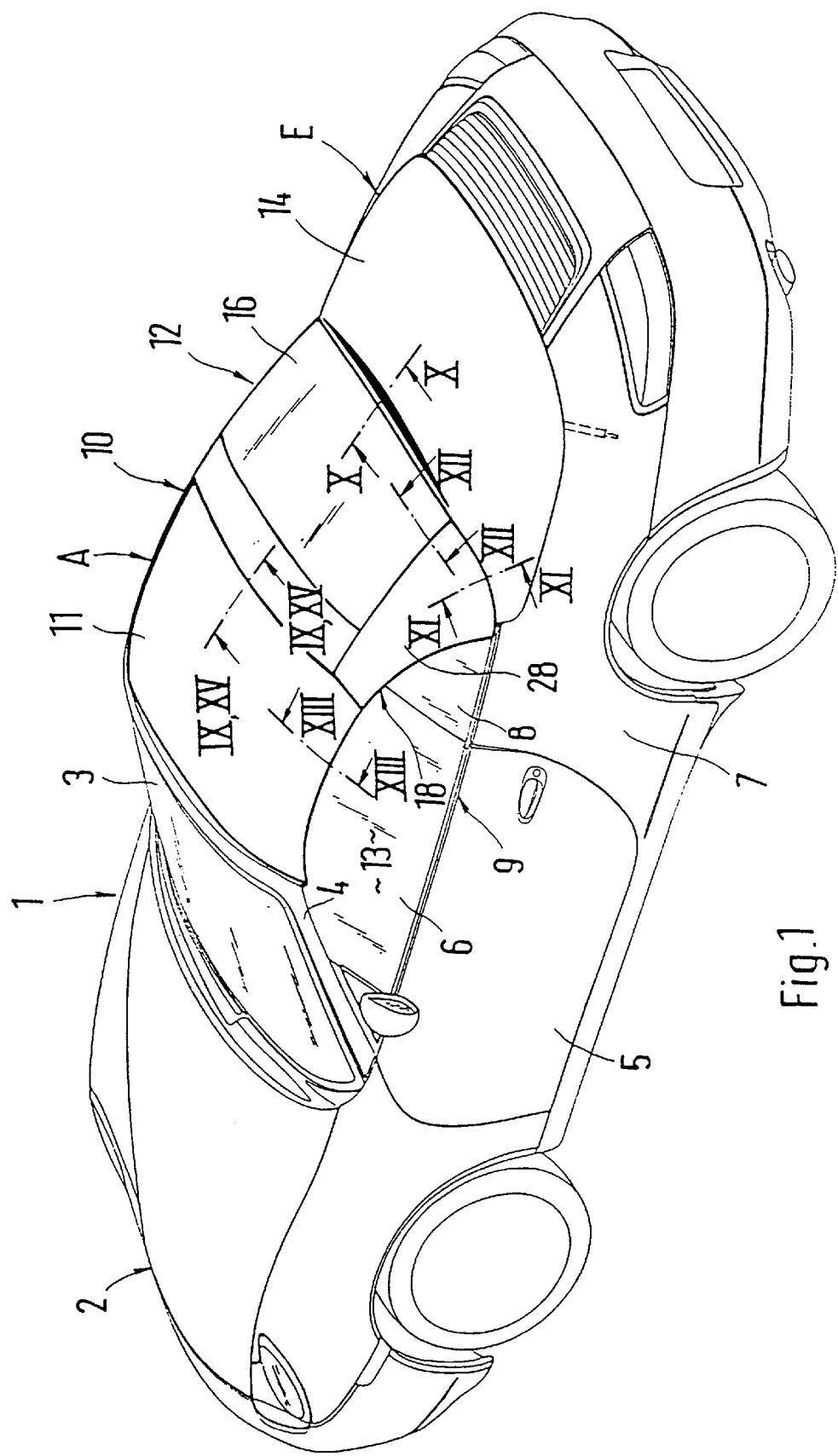
FIG. 1 is a perspective view diagonally from the rear onto a passenger car having a retractable roof construction in the closed position.

A motor vehicle such as a passenger car 1 comprises a stationary vehicle body 2 having a windshield frame 4 receiving a windshield 3; side doors 5 with door windows 6 which can be adjusted in the vertical direction; and rearward side parts 7. The door windows 6 are adjoined by rear windows 8 which can be retracted or folded away toward the rear. Above a belt line 9 of the vehicle body 2, a retractable roof construction 10 is illustrated which comprises at least one roof part 11 arranged above the occupants and an adjoining rear part 12.

The dimensionally stable roof construction can be moved from a closed position A, which completely covers an occupant compartment 13, through intermediate positions, into a rear-side deposited position B and vice versa. In the deposited position B, the roof part 11 and the rear part 12 are accommodated in a rear-side receiving compartment 15 which is closed in the upward direction by a pivotable lid 14.

According to the invention, the rear part 12 comprises a large-surface center part 17. Center part 17 further comprises a rear window 16, and of two side parts 18 arranged on both sides of the longitudinal edges of the center part 17. The center part 17 can be slid completely into the roof part 11 which is disposed in front of center part 17 and together, when the lid 14 is open, can be displaced into the rear-side receiving space 15. The dimensionally stable roof part 11 is supported on its two longitudinal sides 19 by way of one four bar linkage arrangement 20 (FIG. 14) respectively on the stationary vehicle body 2 and can be swivelled from a closed position A into a deposited position B and vice versa.

Each four bar linkage arrangement 20 comprises two spaced control arms 21, 22. As shown in FIG. 19, approximately at the level of the belt line 9 and—viewed in the driving direction—behind the side doors, the lower ends of both control arms 21, 22 are swivellably about, transversely extending, horizontal axes of rotation 23, 24 disposed on the stationary vehicle body 2 on bearing brackets 52. The upper ends of both control arms 21, 22 are hinged to a rearward and center section of the longitudinal course of the roof part 11 by way of transversely extending horizontal axes of rotation 25, 26 (FIG. 14). In the closed position A of the roof 10, the two control arms 21, 22, which have a curved shape, follow approximately the contour of the lateral edge of the roof construction 10.

Figure 8:
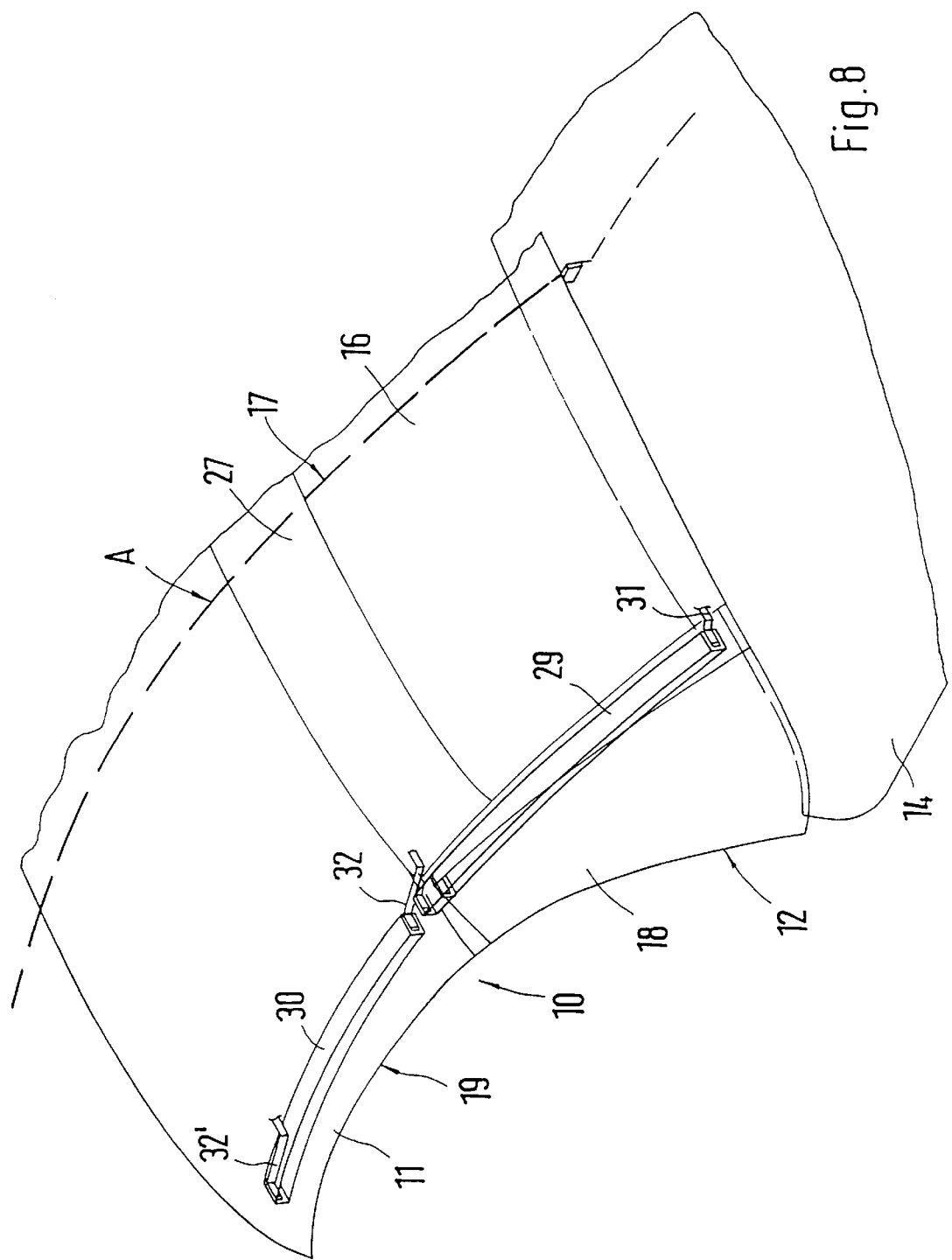
FIG. 8 is a perspective partial view diagonally from the rear onto the roof construction and the rear-side lid.

In the illustrated embodiment of FIG. 8, the center part 17 of the roof part 12 is composed of the large-surface rear window 16 and of a transversely extending narrow frame part 27 which is disposed in front of the rear window 16. The frame part 27 and the rear window 16 form a prefabricated constructional unit. However, the center part 17 may also be only a rear window 16. The center part 17 therefore has a smaller width than the roof part 11 disposed in front of it.

Each side part 18 of the rear part 12 has the shape of a C-column section 28. Each C-column section 28 extends between the rearward, transversely extending edge of the roof part 11 and the adjoining rear-side lid 14 which extends approximately at the level of the belt line 9. The C-column section 28 widens continuously from the roof part 11 toward the belt line 9.

Each side part 18 of the rear part 12 is foldably fastened on the respective rearward control arm 22 of the adjoining four bar linkage arrangement 20 and is therefore carried by the control arm 22. Viewed in the longitudinal direction as seen in FIG. 8, guide rails 29, 30 are aligned on each side part 18 of the rear part 12 and on the roof part 11 which is disposed in front of rear part 12. Bent-away guide elements 31, 32 of the center part 17 interact with these guide rails 29, 30.

Upper guide elements 32 are provided in the laterally exterior, upper edge areas of the center part 17. Guide elements 32 extend from the center part 17 in the direction of the roof part 11 and toward the outside. These guide elements 32 interact with the guide rails 30 mounted on the roof part 11. When the rear part 12 is closed, the upper guide elements 32 of the center part 17 are situated in a rearward end area of the roof part side guide rails 30. When the center part 17 is pushed forward under the roof part 11, the forward guide elements 32 move forward into the roof part side guide rails 30 and take up position 32' (FIG. 8).

The lower guide elements 31 are arranged in the laterally exterior lower edge areas of the center part 17. When the rear part 12 is closed, lower guide elements 31 engage in the guide rails 29 mounted on the side parts 18. When the center part 17 is moved toward the front, the guide elements 31 move along the rear guide rails 29 in the upward direction until they are finally displaced into the roof guide rails 30. Before the center part 17 is slid into the roof part 11, the center part 17 can be folded by means of an upper edge toward the inside into a venting posit-on F (FIG. 15). As illustrated in FIG. 13 in order to permit this, the forward guide elements 32 are in each case constructed in two parts. One part 33 is fixedly connected with the center part 17; whereas the other part 34 is guided in the guide rail 30. A bent-away web 35 of the part 33 is fastened on the center part 17 in this case engages in a corresponding recess 36 of the other part, a defined relative movement being ensured in the vertical direction.

Figure 9:
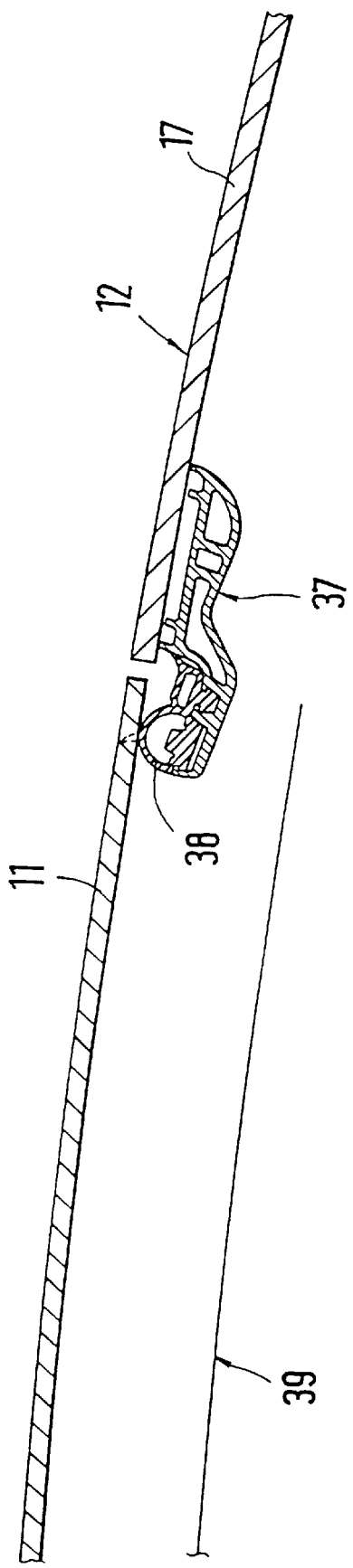
FIG. 9 is an enlarged sectional view according to Line IX—IX of FIG. 1.

As illustrated in FIG. 9, in the closed position A, the roof part 11 and the rear part 12 are placed against one another in a surface-flush manner. On the forward edge of the center part 17 of the rear part 12, a reinforcing frame 37 is provided on the interior side and carries a sealing body 38 which reaches under the forward roof part 11. In addition, FIG. 9 illustrates a vehicle ceiling 39, which extends approximately in parallel with and at a distance from the roof part 11 situated above, in which case the center part 17 can be received in the space situated in-between.

Figure 10:
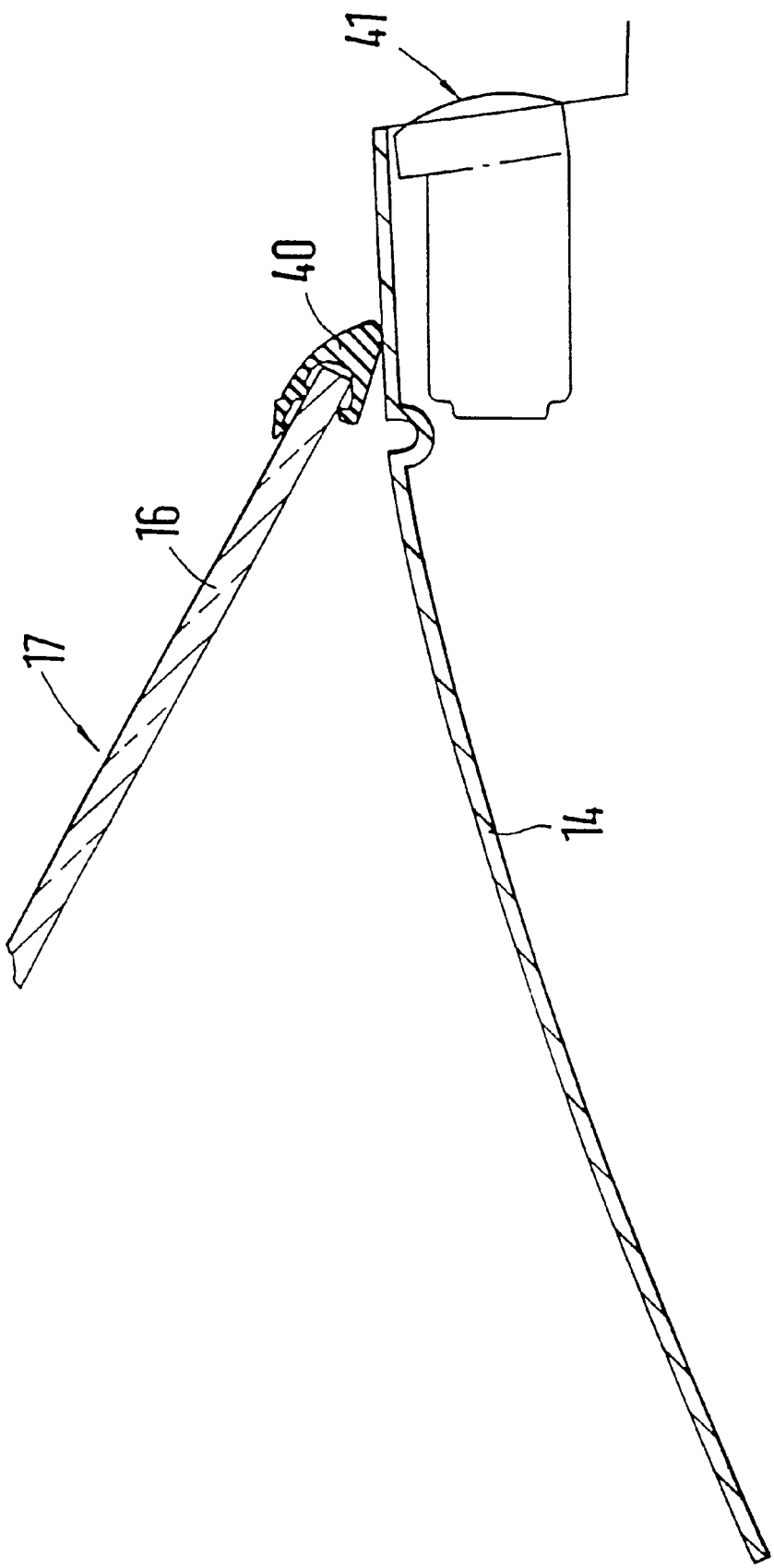
FIG. 10 is an enlarged sectional view according to Line X—X of FIG. 1.

FIG. 10 shows the lower edge of the rear window 16 provided with a fitted-on sealing body 40 having an edge fitted from the outside onto the rear-side lid 14. The lid 14 may be pulled toward the front between the two side parts 18 below the rear window 16. Below the rear edge of the rear window 16, an additional brake sight 41 is arranged on the lid 14 in a central area.

Figure 11:
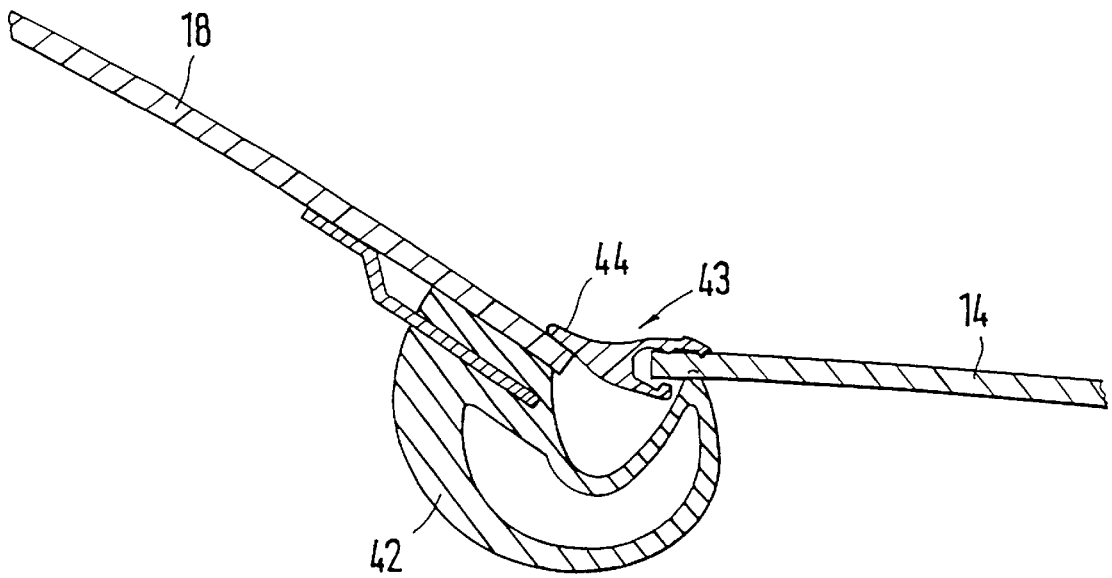
FIG. 11 is an enlarged sectional view according to Line XI—XI of FIG. 1.
Figure 12:
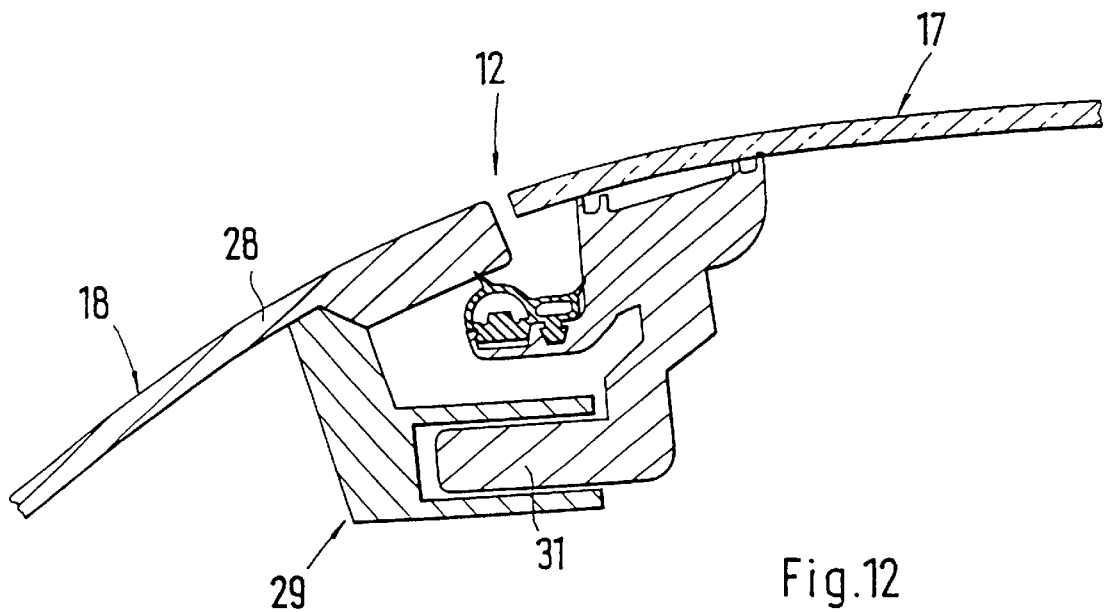
FIG. 12 is an enlarged sectional view according to Line XII—XII of FIG. 1.

As seen in FIG. 11, in the connection area between the side part 18 and the lap 14, the side part 18 carries an interior hose-shaped sealing body 42 which has a section extending under the flap 14. A sealing hinge 43, which is fitted onto the edge side of the flap 14, is supported by means of an arm 44 on the exterior side on the adjoining edge of the side part 18.

Figure 2:
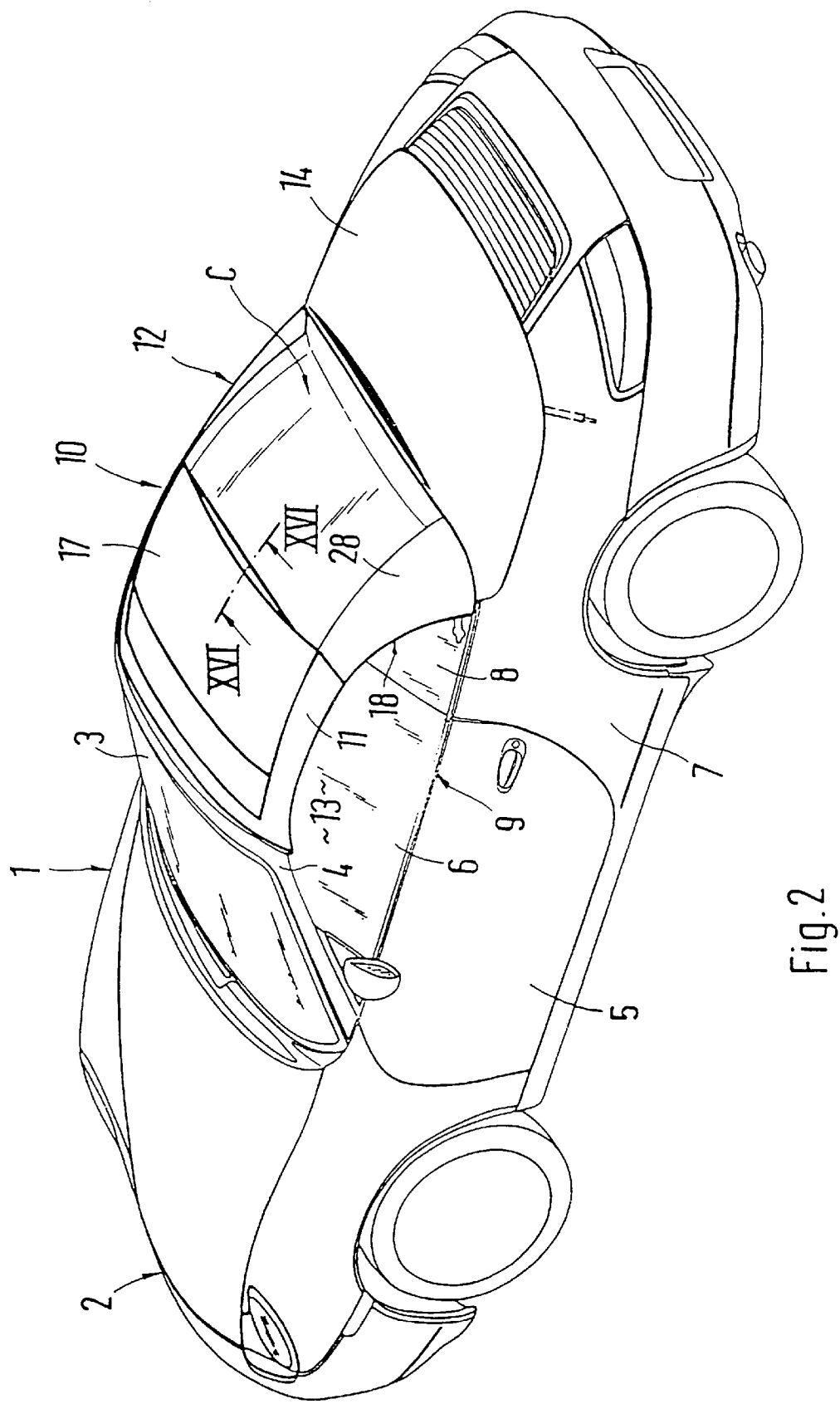
FIG. 2 is a view similar to FIG. 1, in which a center part of the rear part is pushed toward the front under the roof part of the roof construction.

In the closed position A of the roof 10, the roof part 11 is held in position on the adjoining windshield frame 4 by way of a releasable locking device which is not shown in detail. The drive and the unlocking of the roof 10 is preferably motor-driven. In a first step, by actuating an operating switch not shown in detail, the center part 17 is folded toward the inside in the upper area into a venting position (not shown in detail). By another pressing of the operating switch, the center part 17 is slid by way of guide rails 29, 30 toward the front under the roof part 11 so that a relatively large-surface rear opening (position C) will be obtained (FIG. 2).

Figure 3:
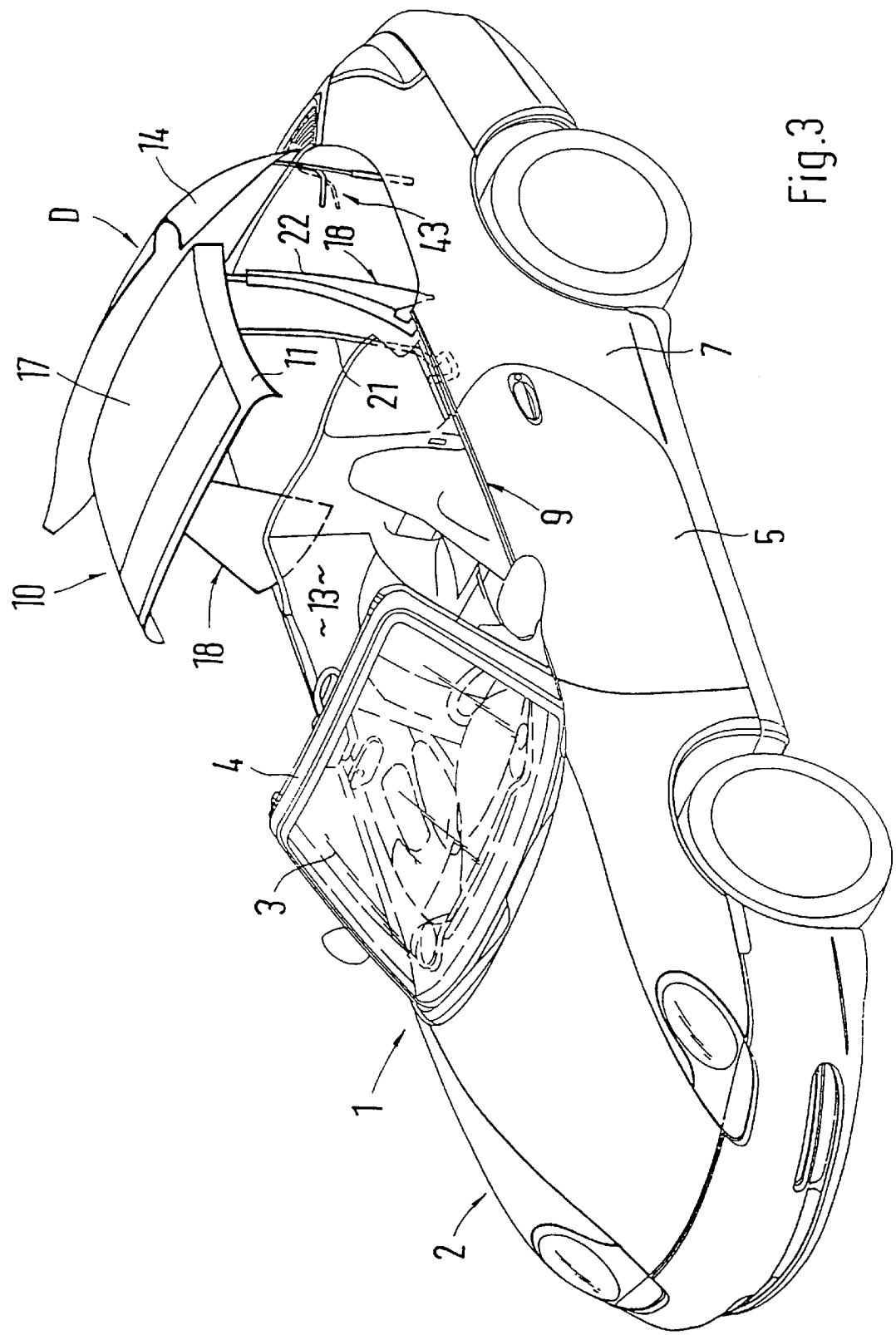
FIG. 3 is a view diagonally from the front onto the passenger car and the roof construction, in which the rear-side flap is open and the roof part together with the pushed-on center part is displaced toward the rear into the rear-side receiving compartment.

If the roof 10 is to be moved completely into the rear-side receiving compartment 15, the lock in the windshield frame 4 is released and the rear-side lid 14 is swivelled up into its opening position D (FIG. 3). In the rear area, the lid 14 is swivellably connected with the vehicle body 2 by way of four bar linkage hinges 43. Each four bar linkage hinge 43 comprises bent control arms 44, 45, which, on the one side, are hinged to a bearing bracket 46 and, on the other side, are hinged to a console 47 of the lid.

Figure 4:
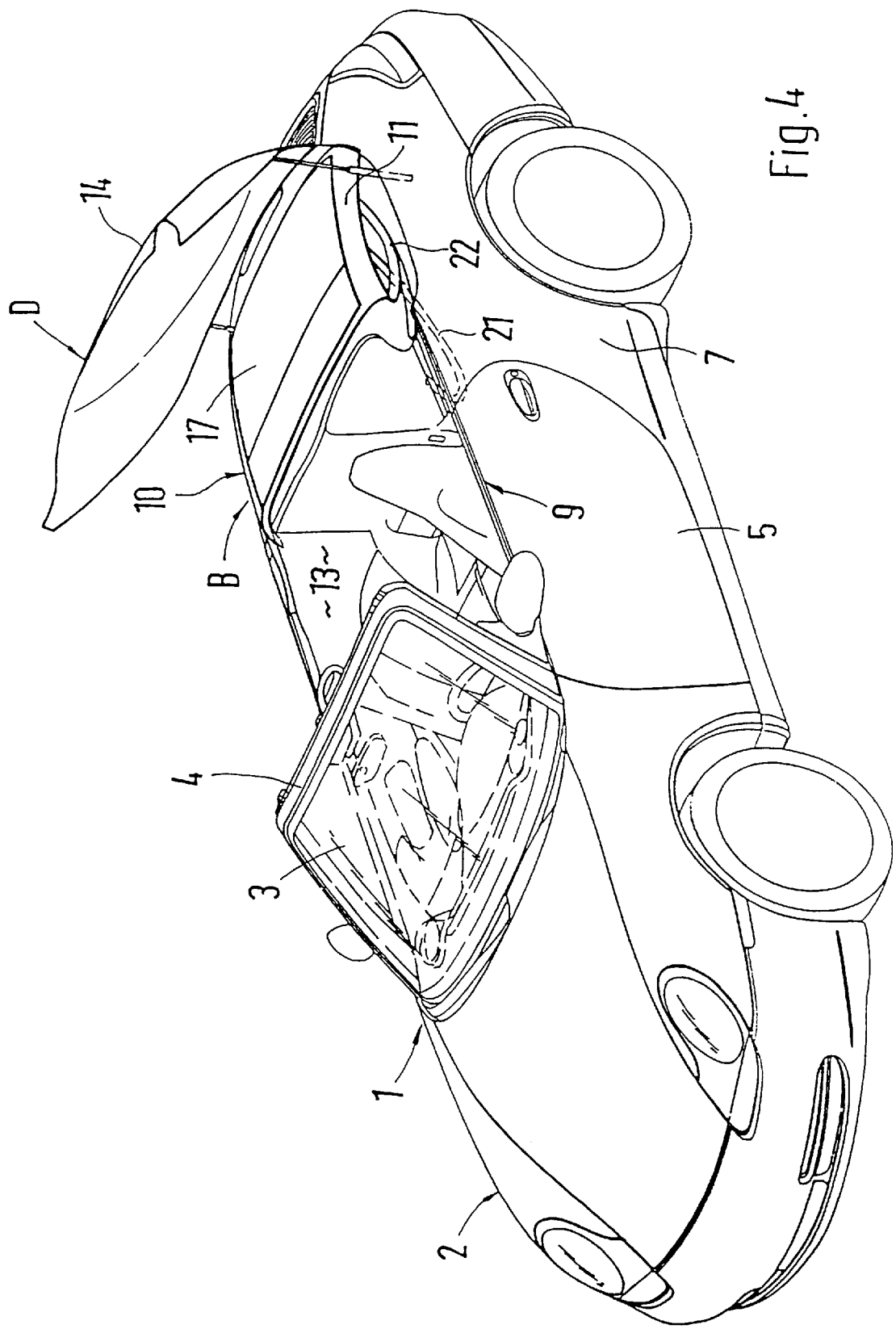
FIG. 4 is a view similar to FIG. 3, in which the roof part together with the pushed-in center part already takes up its deposited position and the rear-side lid is still open.
Figure 5:
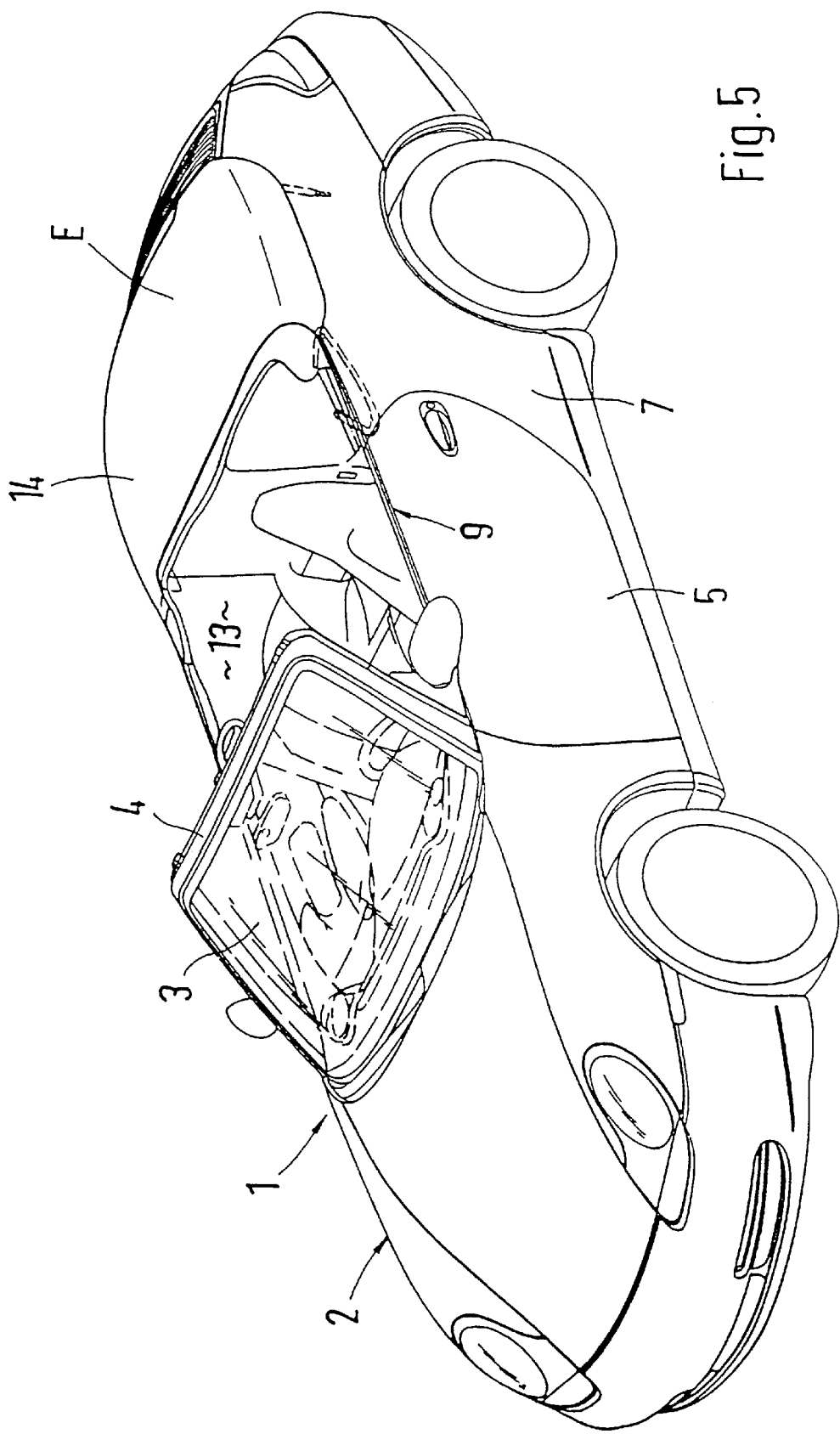
FIG. 5 is a view similar to FIG. 4 but with a closed rear-side lid.
Figure 6:
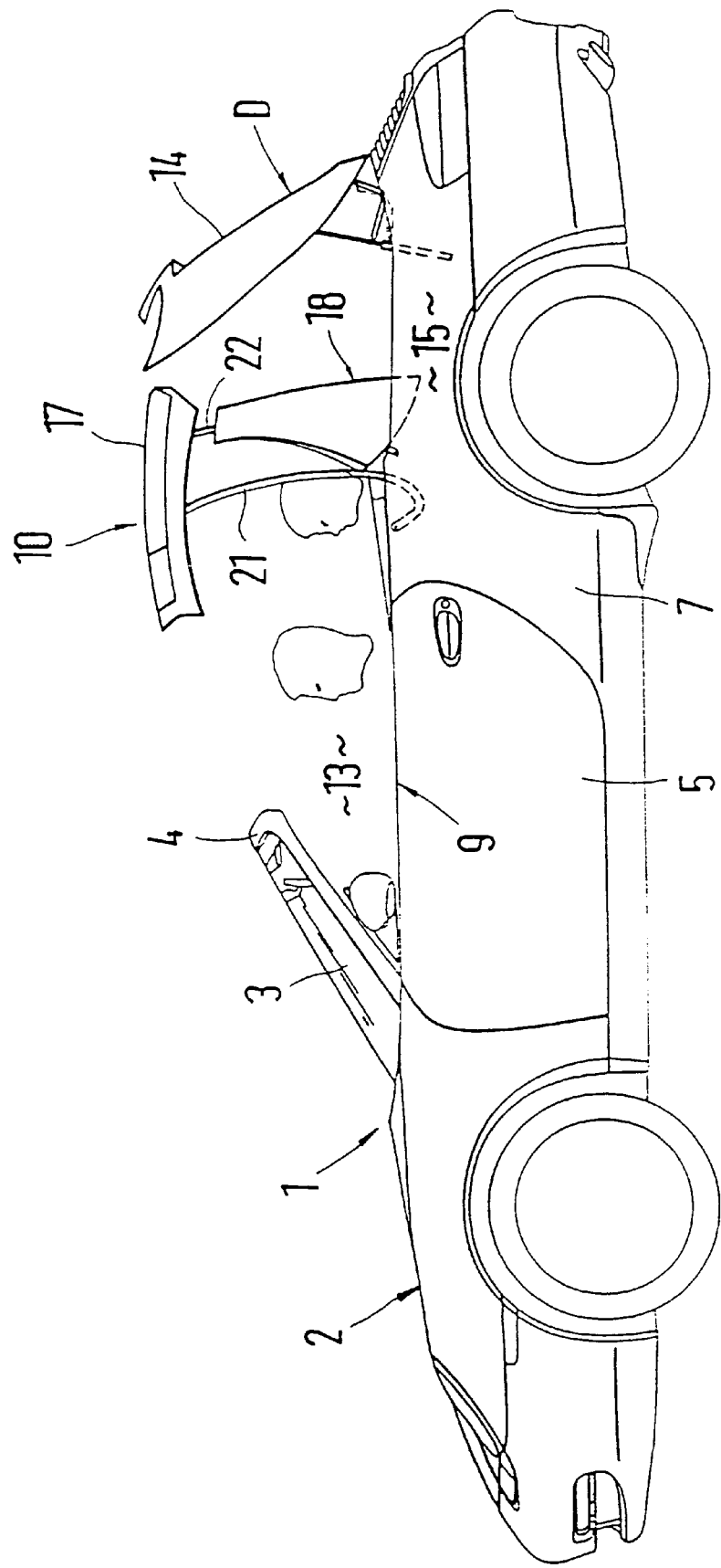
FIG. 6 is a lateral view of the passenger car and the roof construction in a position according to FIG. 3.
Figure 7:
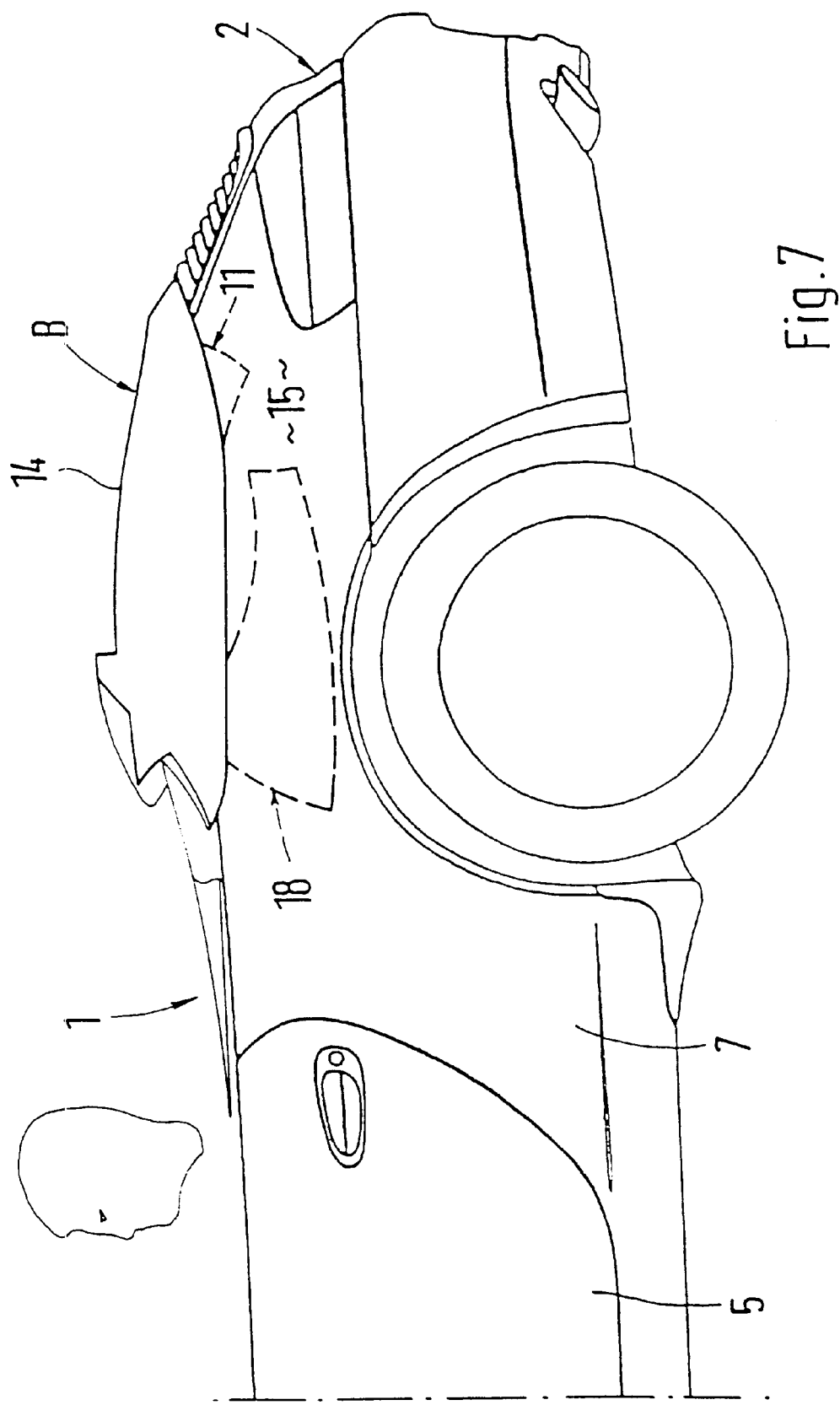
FIG. 7 is a lateral view of the passenger car and the roof construction in a position according to FIG. 5.

The roof part 11 together with the slid-in center part 17 is swivelled from the closed position A by way of intermediate positions into the rear-side deposited position B (FIG. 4), and subsequently, the lid 14 is displaced back into its closed position E (FIG. 5).

In the deposited position B, the side parts 18 of the rear part 12 do not come in contact with the adjoining vehicle-body-side wheel houses. The device kinematics, which are not shown in detail, may be provided between the side parts 18 and the control arms 22 carrying them, which kinematics permit a lateral swivelling-in of the side parts 18.

Figure 20:
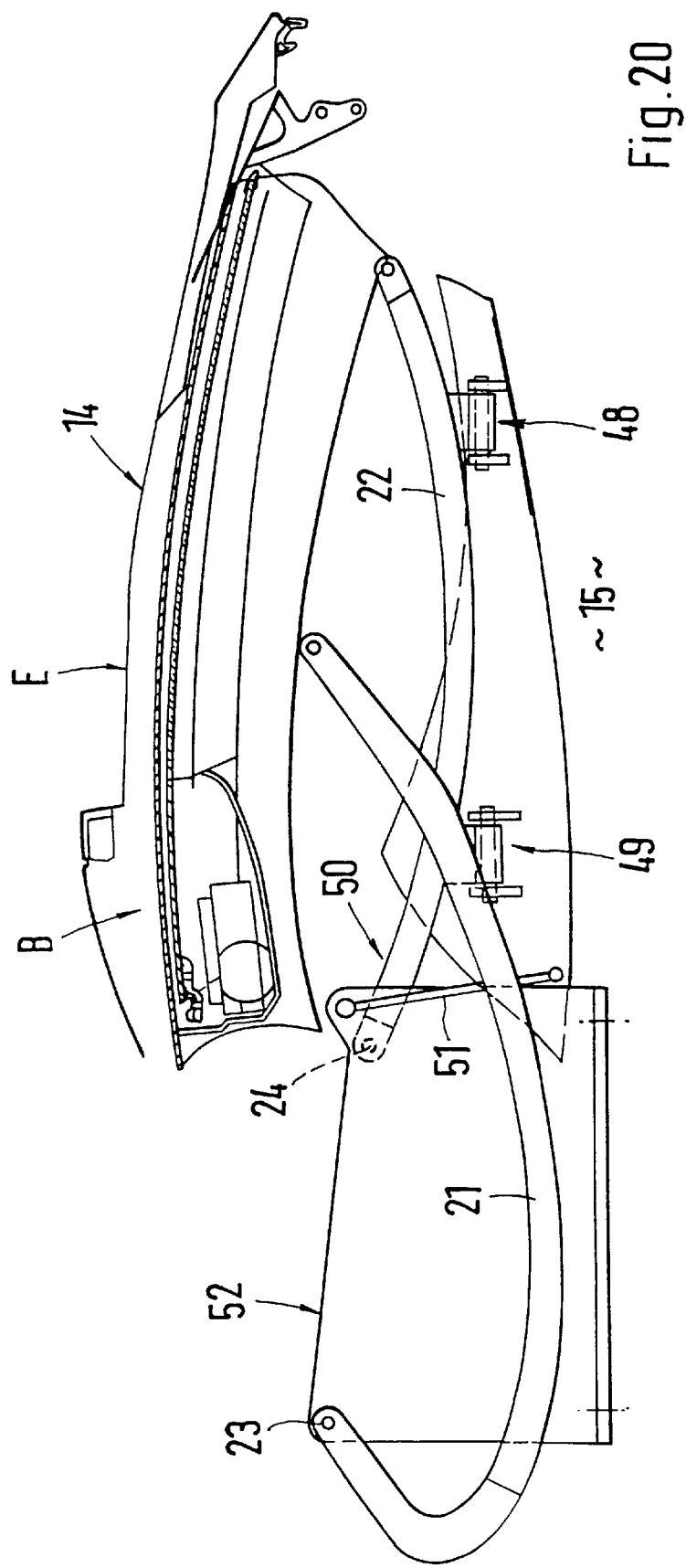
FIG. 20 is a lateral view of the kinematics of the lateral parts in the deposited position of the roof construction

As seen in FIGS. 19 and 20, each side part 18 is connected with adjoining control arm 22 by way of two spaced hinges 48, 49. In addition, the kinematics 50 comprise an adjusting control arm, 51 whose one end is connected to a bearing bracket 52 and whose other end is connected to the side part 18 in the manner of a ball joint. By means of the adjusting control arm 51, the respective side part 18 is forcibly folded toward the interior top.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a retractable roof construction that comprises at least one roof part arranged above an occupant compartment and a rear part having a rear window, the roof construction being movable from a closed position covering the occupant compartment into a rear-side deposited position wherein the rear part and the roof part are received in a rear-side receiving compartment closed by means of an upwardly pivotable lid, wherein the rear part comprises a center part, which further comprises the rear window and two side parts, the center part being slideably retractable into the roof part and being displaceable together with the roof part into the rear-side receiving space, which is selectively covered by a lid.

2. A motor vehicle according to claim 1, wherein the roof part is supported on longitudinal sides by a four bar linkage arrangement on a stationary vehicle body.

3. A motor vehicle according to claim 2, wherein the four bar linkage arrangement comprises two spaced control arms, each control arm having one end rotatably connected with the roof part and another end rotatably connected with the stationary vehicle body.

4. A motor vehicle according to claim 1, wherein the center part comprises a large-surface rear window and a transversely extending frame part which is disposed in front of the rear window, the rear window and the frame part forming a prefabricated unit.

5. A motor vehicle according to claim 1, wherein each side part of the rear part is shaped as a C-column section, each C-column section extending between a rear edge of the roof part and an adjoining rear-side of the lid approximately at the level of a belt line of the vehicle.

6. A motor vehicle according to claim 2 wherein each side part of the rear part is fastened to a rearward control arm of the four bar linkage arrangement.

7. A motor vehicle according to claim 1 wherein guide rails are aligned on each side part of the rear part and on the roof part, and bent-away guide elements of the center part are provided to interact with the guide rails.

8. A motor vehicle according to claim 7 wherein at least one of the guide elements is positioned in upper edge area of the center part to interact with the guide rails mounted on the roof part.

9. A motor vehicle according to claim 8 wherein when the rear part is closed, the guide elements arranged in a lower lateral edge area of the center part interact with the guide rails of the side parts and, when the center part is displaced toward the front into the roof part, interact with the guide rails of the roof part.

10. A motor vehicle according to claim 9 wherein before the center part is slid into the roof part, the center part can be folded toward the interior into a venting position.

11. A motor vehicle according to claim 1 wherein when the roof is deposited in the rear-side receiving space, the side parts can be swivelled toward the interior.

12. A motor vehicle according to claim 10 wherein when the roof is deposited in the rear-side receiving space, the side parts can be swivelled toward the interior.

13. A motor vehicle according to claim 3 wherein each side part of the rear part is fastened to a rearward control arm of the four bar linkage arrangement.

14. A motor vehicle according to claim 3 wherein guide rails are aligned on each side part of the rear part and on the roof part, and bent-away guide elements of the center part are provided to interact with the guide rails.

15. A motor vehicle according to claim 4 wherein guide rails are aligned on each side part of the rear part and on the roof part, and bent-away guide elements of the center part are provided to interact with the guide rails.

16. A motor vehicle according to claim 5 wherein guide rails are aligned on each side part of the rear part and on the roof part, and bent-away guide elements of the center part are provided to interact with the guide rails.

17. A motor vehicle according to claim 6 wherein guide rails are aligned on each side part of the rear part and on the roof part, and bent-away guide elements of the center part are provided to interact with the guide rails.

18. A motor vehicle having a retractable roof comprising:
   at least one moveable roof part positioned over a vehicle occupant compartment; at least one moveable rear part operably connected to the roof part, the rear part further comprising a center part and two side parts, the center part being slideably connected with the roof part, wherein the center part can be slid under the roof part and the roof part together with the center part thereunder can be pivotably displaced and positioned in a rear receiving space.

19. A method for retracting a roof portion of a motor vehicle having a front end and a rear end comprising the steps of positioning a roof part over a vehicle occupant compartment; positioning a slideable rear part to a rear portion of the roof part; pivotable connecting side parts on each side of the rear part; and sliding the rear part along guiding elements towards the front end under the roof part.

20. A method according to claim 19 comprising the further step of pivoting the roof part together with the rear part thereunder toward the rear end of the vehicle and positioning the roof part and rear part in a rear end receiving space.

* * * * *